United States Patent [19]

Bader

[11] Patent Number: 5,763,965
[45] Date of Patent: Jun. 9, 1998

[54] LINEARLY DISPLACEABLE PRECISION TABLE

[75] Inventor: Jürgen Bader, Aalen-Ebnat, Germany

[73] Assignee: Carl-Zeiss-Stiftung, Heidenheim, Germany

[21] Appl. No.: 590,242

[22] Filed: Jan. 23, 1996

[30] Foreign Application Priority Data

Jan. 27, 1995 [DE] Germany .................. 195 02 491.5

[51] Int. Cl.⁶ .................. H02K 41/00; H02K 41/02
[52] U.S. Cl. .................................. 310/12; 310/13
[58] Field of Search .................. 310/12, 13; 33/1 M, 33/503; 74/479 R, 490.09, 16, 479.01

[56] References Cited

U.S. PATENT DOCUMENTS

| | | | |
|---|---|---|---|
| 3,904,900 | 9/1975 | Shichida et al. ............... | 310/12 |
| 4,788,477 | 11/1988 | Teramachi ..................... | 310/12 |
| 4,834,353 | 5/1989 | Chitayat ........................ | 310/12 |
| 4,985,651 | 1/1991 | Chitayat ........................ | 310/12 |
| 5,040,431 | 8/1991 | Sakino et al. ................... | 74/479 |
| 5,216,590 | 6/1993 | Ota ................................ | 364/167.01 |
| 5,228,358 | 7/1993 | Sakino et al. .................. | 74/479 |
| 5,334,892 | 8/1994 | Chitayat ........................ | 310/12 |
| 5,363,774 | 11/1994 | Anada et al. .................. | 33/1 M |

FOREIGN PATENT DOCUMENTS

| | | | |
|---|---|---|---|
| 58-36166 | 3/1983 | Japan ............................ | 310/12 |
| 61-288769 | 12/1986 | Japan ............................ | 310/12 |
| 5-316712 | 11/1993 | Japan ............................ | 310/12 |

*Primary Examiner*—Clayton E. LaBalle

[57] ABSTRACT

The precision table has at least one linear drive for the displacement of a cover plate relative to a baseplate for motion in at least one coordinate axis, wherein the linear drive has at least one magnet and at least one coil. The resultant displacement force acts in the center of the plate that is to be moved.

17 Claims, 10 Drawing Sheets

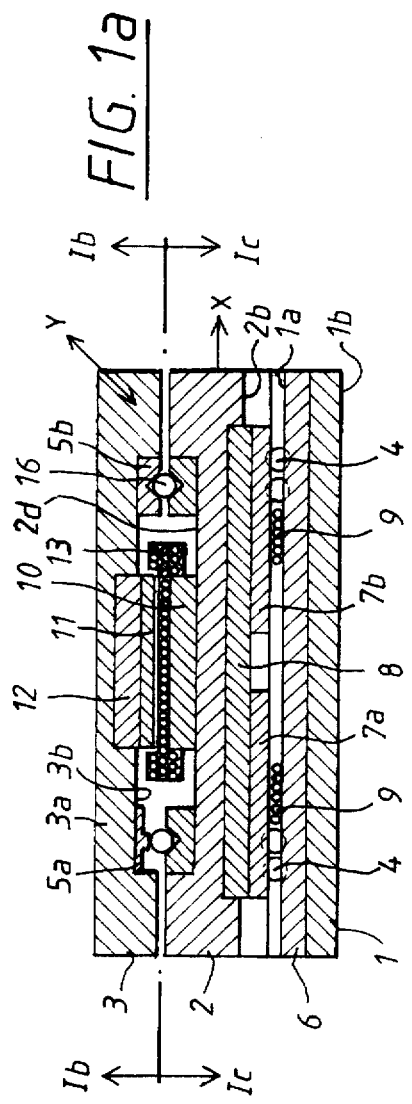
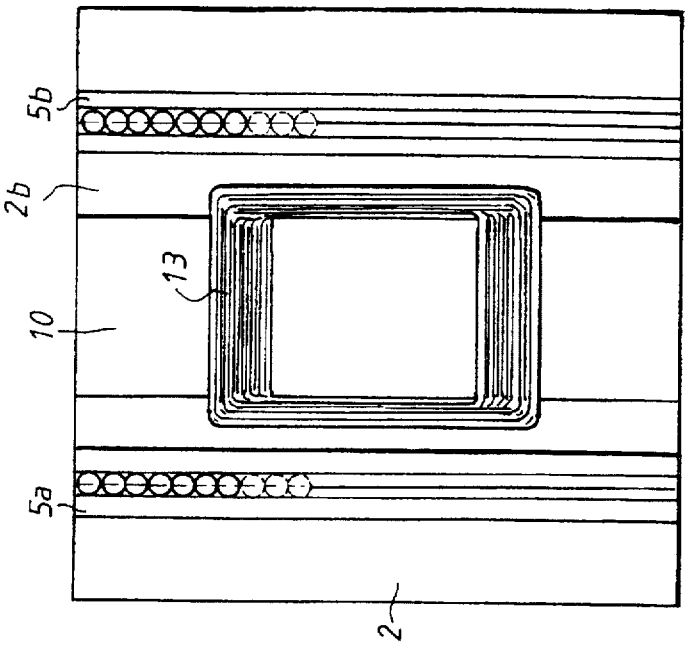
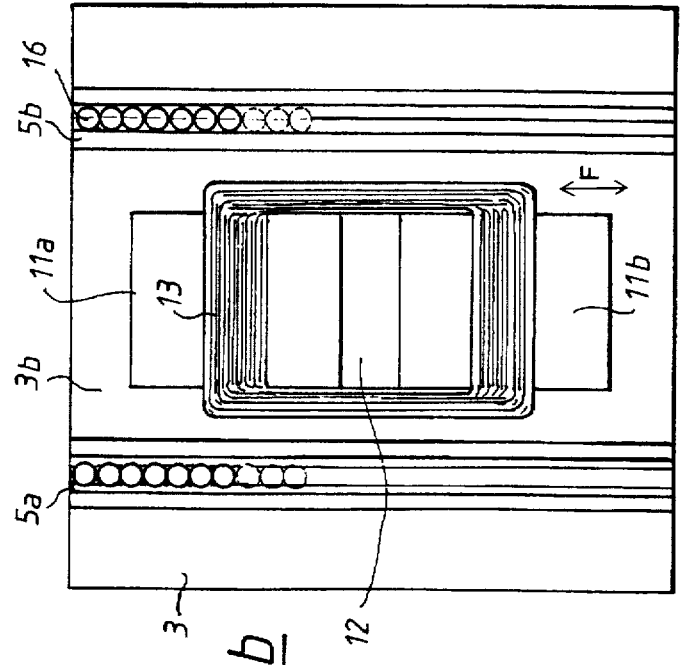

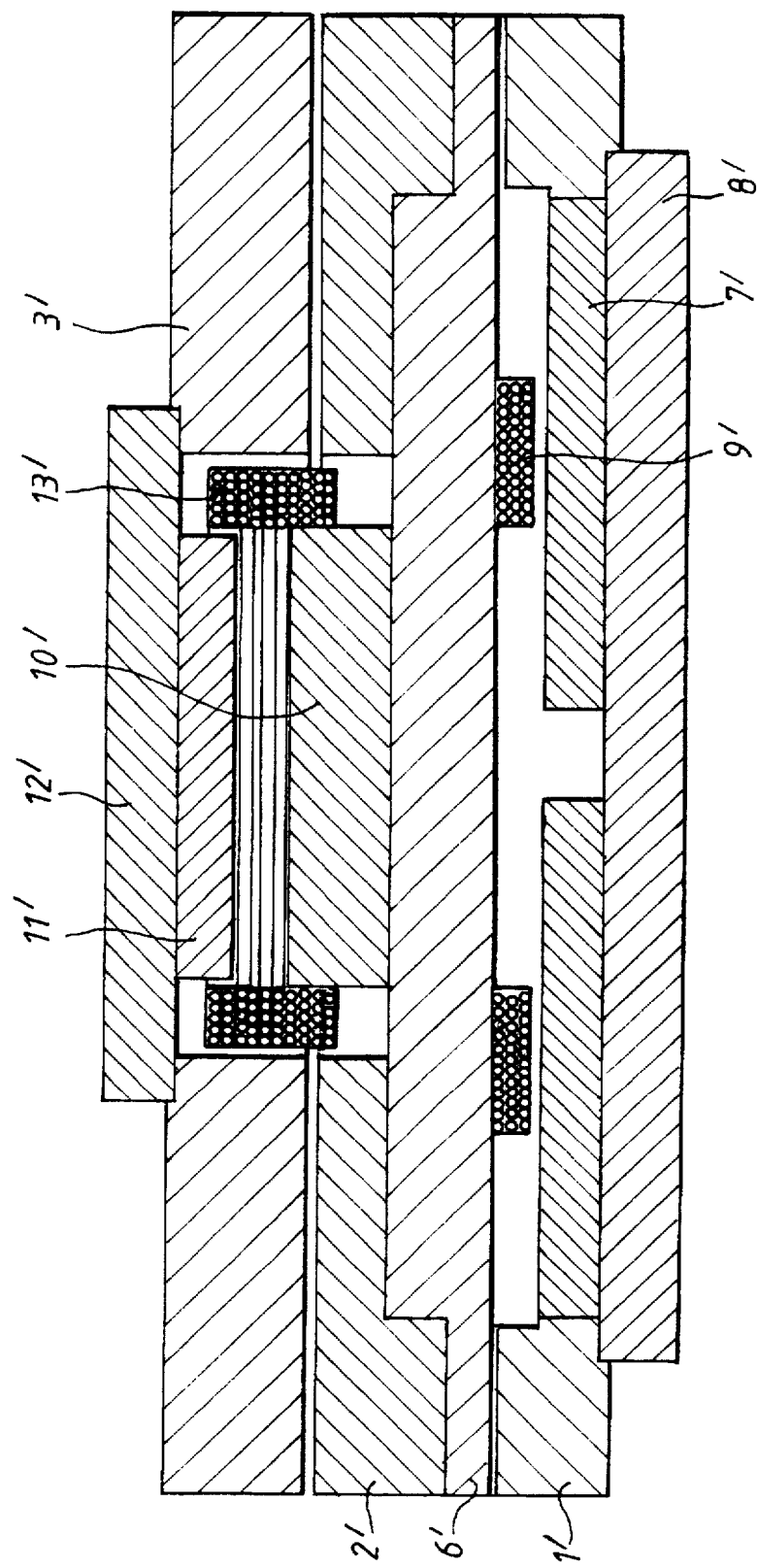

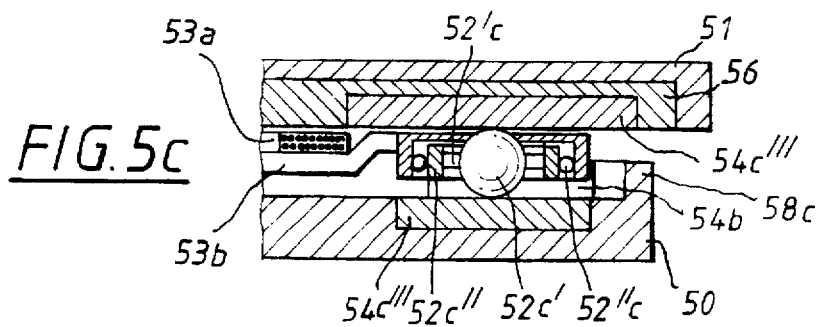
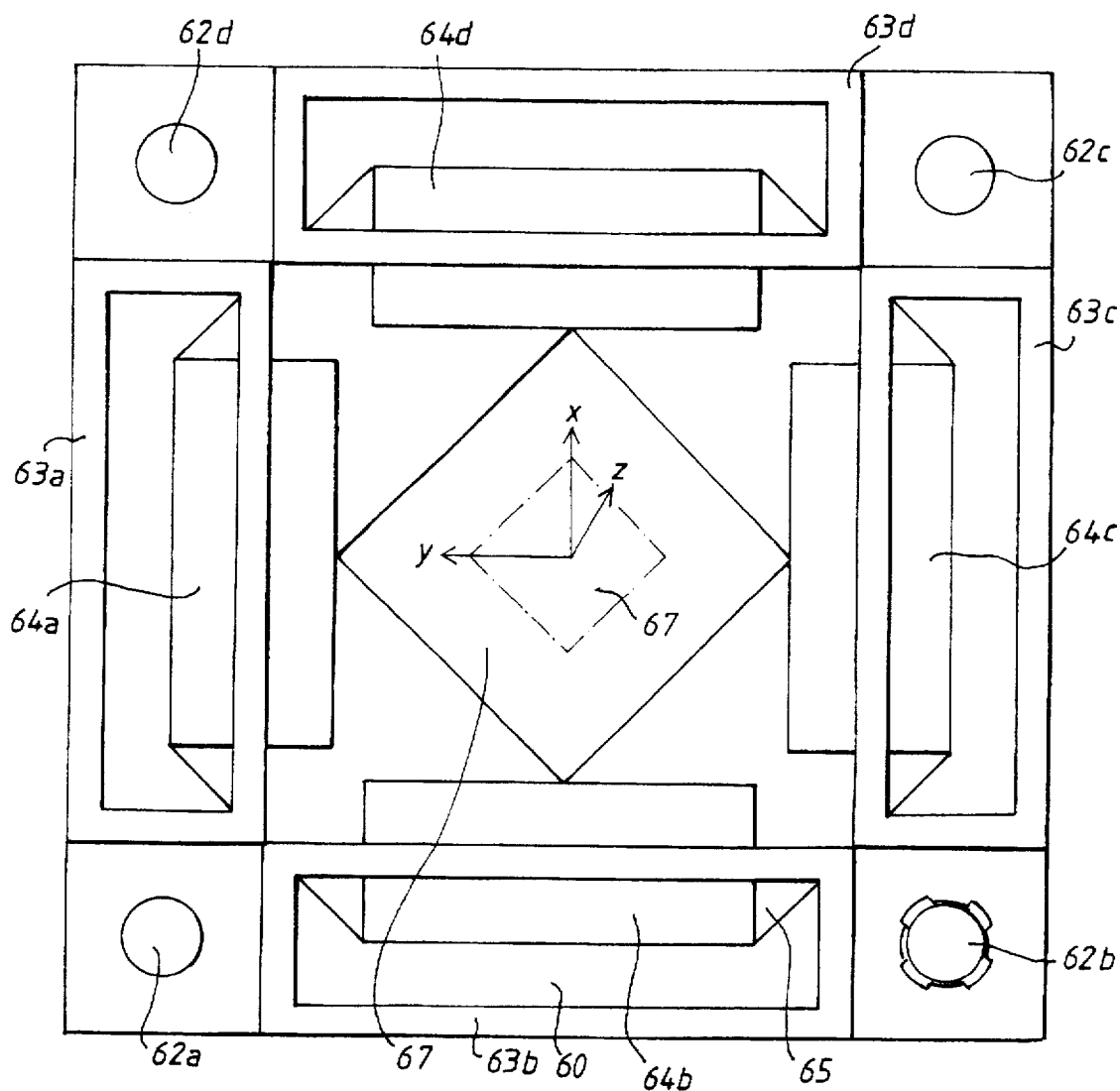

LINEARLY DISPLACEABLE PRECISION TABLE

BACKGROUND OF THE INVENTION

1. Field of the Invention

This invention relates to linearly displaceable precision tables, and particularly to linearly displaceable precision tables embedded as x-y tables.

2. Discussion of Prior Art

Linearly displaceable precision tables are well known from the state of the art, and are particularly well known in their embodiment as X-Y tables. It is also known to magnetically link together two plates of an X-Y table together. Furthermore, linear motors are well known from the state of the art.

It is also known to install a linear motor on an X-Y table. Thus a linear motor with a magnetically preloaded bearing is known from U.S. Pat. No. 4,985,651. The displacement force thereby acts laterally on the table to be displaced.

A two-dimensional motion system is known from U.S. Pat. No. 4,654,571, in which a wafer table with four coils on the underside of the table can be moved over a platform with many magnets. The wafer table is mounted by means of air bearings so as to float on the platform surface. Although the wafer table can be very accurately positioned by means of a costly optical measurement arrangement and a complicated control of the wafer table, this arrangement is very costly and sensitive to vibration. Due to the selected introduction of force, it can take a long time for the desired position to be reached.

An X-Y table is known from U.S. Pat. No. 5,228,358, in which magnets are fitted between the plates of an X-Y table, to provide for a magnetic preloading between the plates. The drive elements themselves are arranged laterally of the plates.

A contactless guided positioning table is known from U.S. Pat. No. 5,216,590, in which also the driving linear motors for the motion in the X-Y plane are arranged laterally.

A motion guiding mechanism is known from U.S. Pat. No. 5,040,431, in which linear motors provide for a motion in the X-Y plane. The magnetic preloading is effected here by magnets which are independent of the linear motors.

It is a disadvantage with a lateral arrangement of a linear drive on an X-Y table that the moving plates tilt during a motion in the X-Y plane; in other words, that a rotary motion of the plates occurs. This can be prevented by applying a linear drive to each of the two sides of the plates. However, this means that the two linear drives must be matched to each other and, in the end, smaller rotary motions of the plates cannot be quite suppressed.

SUMMARY OF THE INVENTION

The invention has as its object to provide a linearly displaceable precision table by means of which a plate can be axially displaced with respect to another plate, without rotary forces arising due to the drive, and in which the number of components required can be kept as small as possible. This object is attained according to the invention by a linearly displaceable precision table for displacement of a cover plate relative to a base plate for motion in at least one coordinate axis by means of at least one linear drive. The linear drive has at least one magnet and at least one coil, a cover plate, and a base plate. The magnet and the coil are mounted alternatively on the lower side of the cover plate and the upper side of the base plate, such that a resultant force of the magnet and the coil is exerted centrally on a plate to be moved.

The precision table according to the invention, in which a plate to be moved is magnetically preloaded with respect to a plate which is at least relatively stationary, has the advantage that a precision motion is obtained which is well controllable, which exerts little load on the bearings or the mounting between the plates, and which ensures a long, maintenance-free operation of the precision table.

A linear drive is particularly suitable as the drive and effects, besides the drive function, the magnetic preloading between the two plates. This linear drive is constructed, according to the known state of the art, from at least one magnet and at least one coil.

By the introduction of the resulting displacement force in the center of the plate to be moved, while the drive as such can itself be arranged, not centrally but laterally, the precision motion is very accurate. The embodiment with a linear drive has a double advantage:

(1) in the first place, the two plates can be magnetically preloaded, and a more certain motion of the one plate on the other can be ensured;

(2) on the other hand, the magnets for preloading the two plates can likewise be used as a part of a linear drive, so that the precision table becomes very compact and the drive can be built in, without problems, between the two plates.

Advantageously, the lines of force of the magnet and coil are oriented essentially perpendicular or parallel to the axis of motion of the plate which is moved.

If the magnets of the linear drive are used for preloading the two plates toward each other, the advantage already stated above is obtained.

A respective ball bearing is advantageously fitted, parallel to the axis of motion, between the two plates.

In order to facilitate the control of the linear drive, a middle plate can be provided, so that the one motion axis is given by the motion of the middle plate relative to the baseplate and the other motion axis by the motion of the cover plate relative to the middle plate.

A mechanically limited range of movement can be established with an end stop for the plate which is moved.

If the linear drive is divided, a free middle opening can be obtained. This is advantageously a through passage.

A mounting of the plates which is free from friction can advantageously be obtained by air bearings. By mounting the rolling balls in a cage, a 1:2 conversion can be effected.

BRIEF DESCRIPTION OF THE DRAWINGS

The invention is described hereinbelow by way of preferred embodiments and in more detail, with reference to the accompanying FIGS. 1a–8d, further inventive concepts being explained in the description of the Figures. In detail, the Figures show the following.

FIG. 1a shows a section through a first variant according to the invention;

FIG. 1b shows a section through the variant shown in FIG. 1a, parallel to the upper ball bearing guides in the cover plate;

FIG. 1c shows a section through the variant shown in FIG. 1a, parallel to the lower ball bearing guides in the middle plate;

FIG. 2 shows an alternative variant to the arrangement shown in FIG. 1a;

FIG. 3b shows a variant in section, using the rolling path reduction described in FIG. 3a;

FIG. 3c shows a further variant, in section, using the rolling path reduction described in FIG. 3a;

FIG. 4b shows a vertical section (IVb) through the table shown in FIG. 4a;

FIG. 4c shows a vertical section (IVc) through the table shown in FIG. 4a;

FIG. 5c shows a section through the table of FIG. 5a along the section line (Vc);

FIG. 6 shows a further variant according to the invention, in a plan view section, which is effected with only two plates moved relative to each other;

FIG. 8b shows the table of FIG. 8a in section in the Y-axis along the section line (VIIIb) of FIG. 8a;

DETAILED DESCRIPTION OF PREFERRED EMBODIMENTS

Figure 2A:
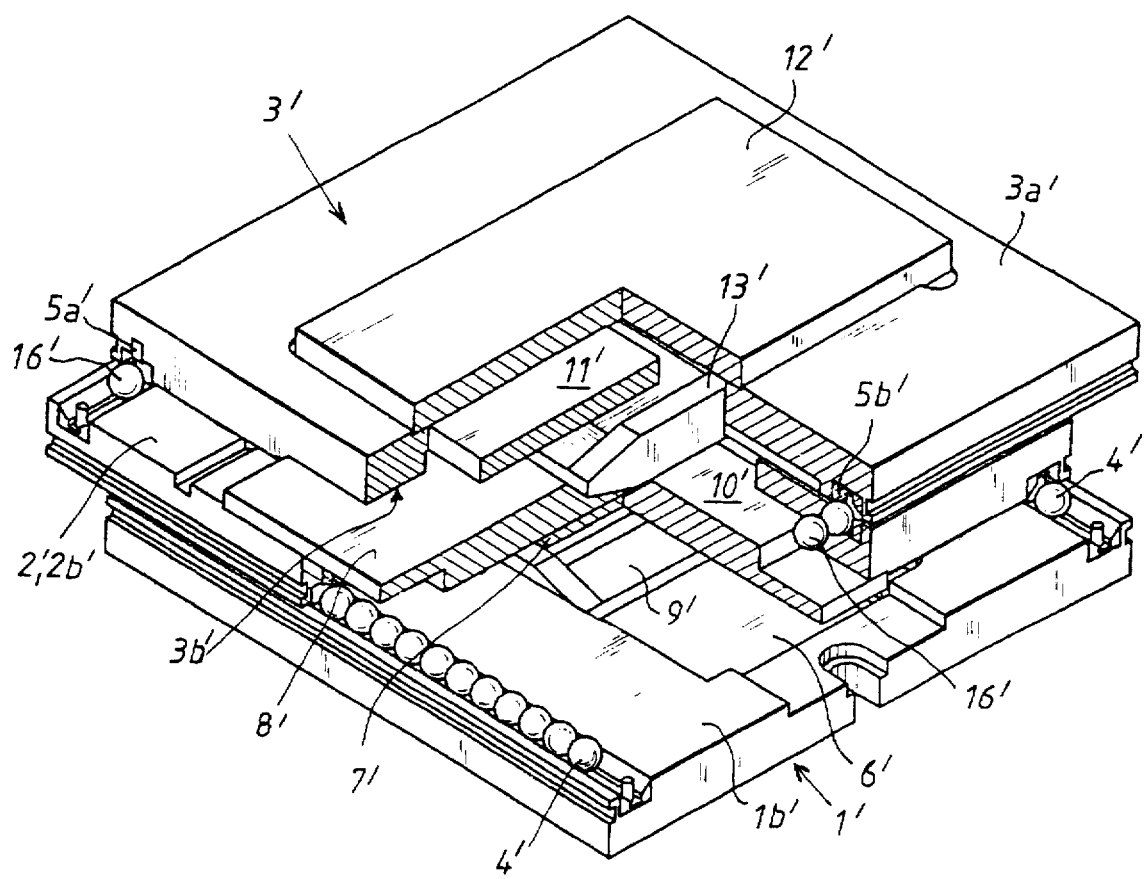
FIG. 2a shows a three-dimensional representation of the arrangement shown in FIG. 2.

The linearly displaceable precision table shown in FIG. 1 is shown in section in the X-Z plane in FIG. 1a, and in section in the X-Y plane in FIGS. 1b and 1c.

The table consists of a baseplate (1), a middle plate (2), and a cover plate (3), and has an upper side (3a), displaceable in the X-Y plane, of the cover plate (3). The three plates (1, 2, 3) consist of a non-magnetic material.

The baseplate (1) rests with its smooth underside (1b) fixedly on a base (e.g., a table). A soft iron yoke (6) is inserted on the upper side (1a) of the baseplate (1).

This soft iron yoke (6) extends axially in the direction of the axis of motion (i.e., here, in the x-axis direction), and is dimensioned such that it substantially coincides with the lateral extent of the magnets (7a, 7b) mounted on the middle plate (2). Its axial extent is dimensioned such that the moved magnets (7a, 7b) on the middle plate (2) never project over this soft iron yoke (6). The soft iron yoke (6) and the baseplate (1) both end in the X-Y plane, i.e., the combination of soft iron yoke (6) and baseplate (1) substantially forms a rectangular body which has its greatest extent in the X-Y plane and which has planar upper and lower surfaces, (1a, 1b), the flatness of the upper surfaces being interrupted only by two ball bearing guides with rolling bodies (4) (balls or ball cylinders).

A copper coil (9) with many turns is wound onto the soft iron yoke (6), the turns being arranged at right angles to the direction of motion and substantially flat in the X-Y plane. This coil (9) can be supplied with a variable current from the exterior, so that the magnetic field which it can produce has a magnitude which can be varied from the exterior.

A respective ball bearing guide with balls (4) is mounted between the baseplate (1) and the middle plate (2) on each side of the drive axis. The two ball bearing guides with their balls (4) are aligned mutually parallel in the direction of the drive axis. One of the two ball bearing guides also permits, to a small extent, a motion of the balls (4) guided in it at right angles to the direction of the guide. In contrast to this, the other ball guide is configured such that the balls (4) present in it can definitively move only in the axis of the ball guide.

This is clearly to be seen in FIG. 1a for the two ball bearing guides (5a, 5b) between the middle plate (2) and the cover plate (3).

A linear drive is arranged between these two ball guides with their balls (4). This linear drive essentially consists of the described soft iron yoke (6) on the upper side of the baseplate (1) and two magnets (7a, 7b) which are mounted on a soft iron plate (8) on the underside of the middle plate (2). This soft iron plate (8) is firmly connected to the underside (2b) of the middle plate (2).

The soft iron plate (8) is substantially of exactly the same width as the magnets (7a, 7b) which are mounted on it. The soft iron plate (8) ends essentially at the outer ends of the magnets (7a, 7b). An empty interspace exists between the two magnets (7a, 7b) mounted on the soft iron plate (8). The magnets (7a, 7b), which are rectangular in shape, have a relatively large, substantially rectangular extent in the X-Y plane, and only a relatively small extent in the Z-axis. They are mounted on the soft iron plate (8) so that one magnet (7a) is mounted with its south pole on the soft iron plate (8), while the other magnet (7b) is mounted with its north pole on the soft iron plate (8). The two magnets (7a, 7b) are permanent magnets, in order to keep the power consumption of the drive device as small as possible.

The middle plate (2) substantially consists of a rectangular body, which has its largest surfaces in the X-Y plane. During an axial motion of the middle plate (2) in the axial direction, the upper (5a, 5b) and lower ball bearing guides have the effect that the distance between the coil (9) on the lower soft iron core (6) and the magnets (7a, 7b) is always constant in the permitted range of motion.

Two ball bearing guides (5a, 5b) are fitted laterally to the upper side (2a) of the middle plate (2) and are positively locked to the outer edges of the surface of the middle plate (2). The surface of the middle plate (2) has, between the two ball bearing guides (5a, 5b), a recess in which a soft iron yoke (10) for the upper single-axis linear drive is fitted. This soft iron yoke (10) has laterally a certain free space in the direction of the ball bearing guides.

The upper soft iron yoke (10) has an extent, transverse to the drive direction, substantially corresponding to the lateral extent of the magnet of the linear drive arranged above the yoke. Its axial extent is dimensioned such that the driven magnets (11) on the cover plate never project beyond this soft iron yoke (10).

A second coil (13) is fitted on this upper soft iron yoke (10). This coil (13) is shown in FIG. 1b. As for the coil (9) of the lower linear drive, the closed coil body is here also wound transverse to the direction of motion, such that the windings of the coil (13) are substantially mutually adjacent in the X-Y plane. In contrast to this, the windings of the coil

(13) are arranged parallel to the direction of motion, such that a substantially square cross section results.

The windings of the coil (13) which are oriented at right angles to the direction of motion lie, in the basic position of the plates (1, 2, 3), exactly in the middle of the magnets (11a, 11b), as shown in FIG. 1b. The surface of the magnets (11a, 11b) is dimensioned such that the coil (13) is always located in the space above/below the magnets (11a, 11b) independently of whether the motion takes place in the + or − direction on the axis of motion.

The linear ball bearings (5a, 5b) indicated in FIGS. 1b and 1c respectively each consist of two V-rails on the underside (3b) of the cover plate (3) and on the middle plate (2). They are adjusted with respect to each other such that they are exactly parallel to each other. The balls (16), confined in cages, run between the V-rails.

The coils (9) and (13) are horizontally wound and lie in the air gap between the yokes, (6) and (10), and the permanent magnets (7a, 7b and 11a, 11b). The permanent magnets (7a, 7b or 11a, 11b) are thus connected magnetically in series by means of the soft iron plate (8) or (12).

The magnetic circuit is closed by the yoke (6) or (10), the two air gaps between the magnets (7a, 7b) and the coils (9, 13) or the soft iron plates (8 or 12). The magnets (7a, 7b) or (11a, 11b) exert an attractive force on the yoke (6) or (10), which tends to close the air gaps between them. The air gap is however kept to a defined amount by the linear ball bearing guides (5a, 5b). Hence the opposed plates (1, 2, 3) are magnetically preloaded against each other.

The force with which, e.g., the V-rails of the baseplate (1) and the middle plate (2) are pressed against the balls (4) is the magnetic attractive force which prevails between the yoke (6) and the permanent magnet (7a, 7b). The attractive force is calculated according to the equation:

$$F = \frac{1 \times B_L \times A}{2\mu_0} \quad [N]$$

$B_L$=air gap induction;
A=pole surface;
$\mu_0$=magnetic field constant=$1.257 \times 10^4$ (T×cm)/A
T=tesla, a unit of magnetic flux density in the mks system (equivalent to one weber per square meter)

If current flows in the coil (9 or 13), a force then arises, by the electromotive principle, between the coil (9 or 13) and the permanent magnet (7a, 7b or 11), and thus between the baseplate (1) and the middle plate (2), or between the middle plate (2) and the cover plate (3), parallel to the respective linear ball bearing guides (5a, 5b).

The second direction of motion takes place between the middle plate (2) and the cover plate (3), and is rotated through 90° with respect to the first direction of motion between the baseplate (1) and the middle plate (2). The soft iron yoke (10) and its coil (13) form, with the magnet (11) on the soft iron plate (12), the second linear drive, analogous to the first drive.

The yoke (10), with the coil (13) and the lower two V-rails of the linear ball bearing (5a, 5b), are firmly anchored to the middle plate (2). The soft iron plate (12), with the magnet (11) and the opposed two V-rails of the ball bearing guides (5a, 5b) of the ball bearings are fixedly connected to the cover plate (3).

A two-dimensional incremental path measurement system (not shown in the Figure) is also fitted to the table, and is used for position measurement.

Force is introduced with respective symmetry into the table by the linear motors, so that no radial forces arise. This increases the displacement accuracy of the table in each of the two permitted directions of motion.

For applications in which position accuracies in the nanometer range and a long time constant, even with temperature fluctuations, are important, the plates (1, 2, 3) can be made of, e.g., Zerodur. The balls (4) or (16) are advantageously made of ceramics.

There prevails between the respective plates only the rolling and static friction of the balls (4) or (16), so that only relatively small thrust forces are required for the displacement of the plates relative to each other. The power dissipation in the coils is small and thus the heating of the plates also remains small.

The overall displacement path amounts in this illustrated arrangement to about 25 mm, i.e., respectively 12.5 mm in each direction on the axis of motion.

Alternative solutions for an X-Y displacement table are shown in the following Figures.

In FIGS. 2 and 2a there is shown an alternative arrangement of the coils (9', 13') and magnets (7', 11') with respect to each other on the baseplate (1'), middle plate (2') and cover plate (3'). The current for the coils (9', 13') has to be conducted only to the middle plate (2'), since both coils (9', 13') are fastened to this plate (2').

In other respects, all the other details given for the arrangement shown in FIGS. 1a–1c correspondingly apply, as regards the soft iron yoke (6', 10'), the magnets (7', 11'), the coils (9', 13'), the soft iron plates (8', 12') and the materials used, since there takes place here substantially only an exchange of positions of the magnets (7', 11') with respect to the coils (9', 13') and vice versa.

The reference numerals of the FIGS. 1a–1c are therefore used correspondingly in FIG. 2, but with an added (') (i.e., (1) in FIGS. 1a–1d corresponds to (1') in FIGS. 2 and 2a).

To improve the clarity, the ball bearing guides with the balls guided in cages, which are also present in the arrangement shown in FIG. 2, although they have to be constructed as described in FIGS. 1a–c, are not shown in FIG. 2.

In FIG. 2a, a variant according to FIG. 2 is shown in a three-dimensional illustration. It is then also evident here that the X-Y table according to the invention can essentially be compactly constructed, which is not the case with the state of the art.

Figure 3A:
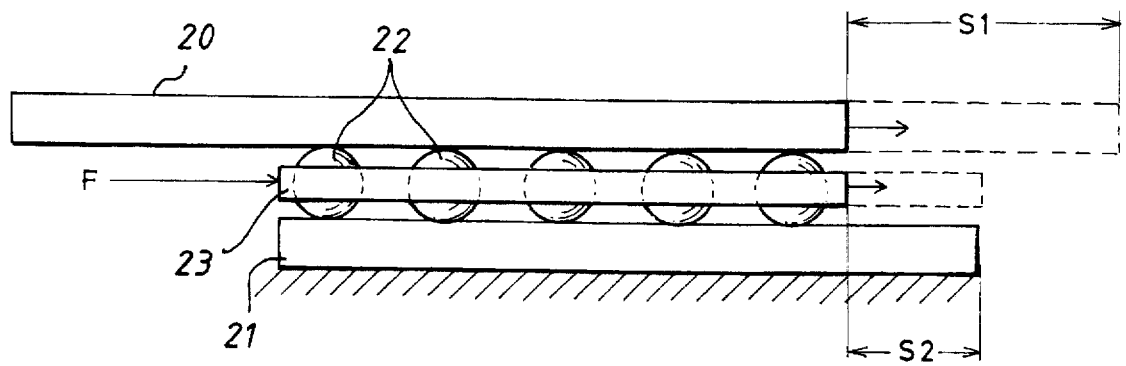
FIG. 3a shows a conceptual diagram for the reduction of the rolling paths of the balls of the ball bearing.
Figure 3B:
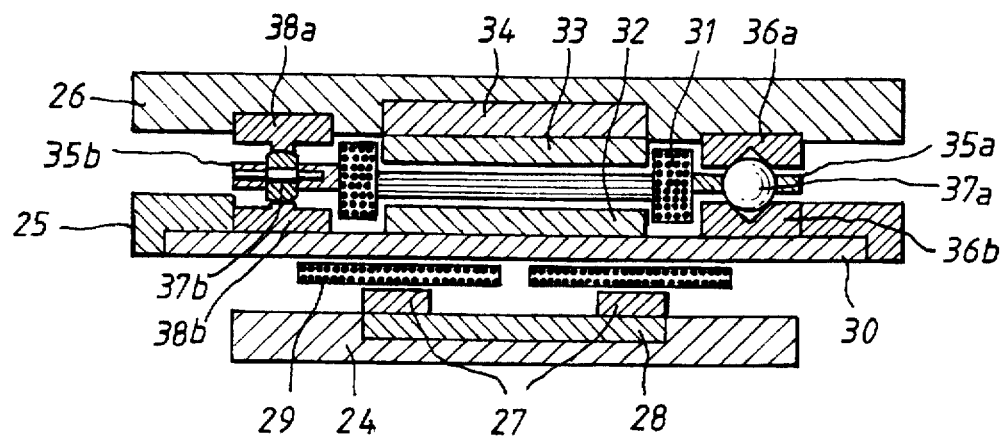
Figure 3C:
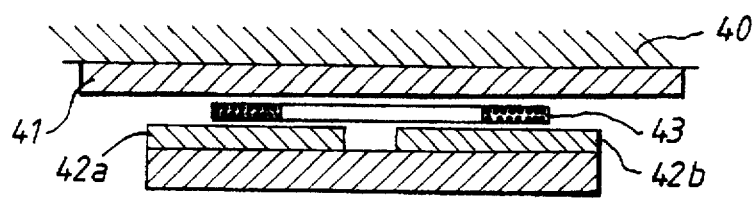

A linearly displaceable table with a speed changing transmission is shown in FIGS. 3a–c; in it, the balls of the ball bearing have to travel only half the path in a motion of the one plate relative to the other plate.

In a rotating ball bearing with balls, a ball cage moves at half the speed of the shaft. In a linear ball bearing, this effect is necessarily the same. This effect is used here for path doubling.

FIG. 3a shows two superposed plates (20, 21). Rollers (22) run between the plates (20, 21), and are confined and held in a cage (23). If the upper plate (20) is displaced over a path length $s_1$, the roller bearing cage travels only half the path, $s_2$ (gearing down).

If a force F is introduced on the roller bearing cage (23) instead of on the upper plate (20), the reverse effect is produced (gearing up). The upper plate (20) moves twice as fast as the roller bearing cage (23).

If the cage (23) is coupled to the coil of a linear drive (not shown in FIG. 3a; to be effected technically as shown in FIG. 2 and described for FIGS. 1a–1d), an X-Y linear motor can for example be visualized, in which the table displacement has to be only half the path as compared with the motor. This has the advantage that the coil or the permanent magnets (not shown here) have to be only half as long.

FIG. 3b shows a possible embodiment of an x-y linearly displaceable table with a wide coil (29) and narrow magnets

(27) in a schematic X-Z section. The coil width is here the displacement path plus the width of a magnet.

The magnets (27) are fastened to one side of a soft iron plate (28) corresponding to the descriptions of FIGS. 1a–1d, while the soft iron plate (28) is fastened to the baseplate (24) on the opposite side.

A soft iron yoke (30) is mounted on the underside of the middle plate (25). Linear ball bearings lie between the baseplate (24) and the middle plate (25), analogously to those described below.

A soft iron yoke (32) is mounted on the upper side of the middle plate (25), between two ball bearings (36a, 36b; 38a, 38b). The coil (31) or (29) is now fastened firmly to the ball cages (35a, 35b) of the linear ball bearings (36a, 36b and 38a, 38b), so that it can move freely in the magnetic field between the magnets (33, 27) and the yokes (32, 30). The balls (37a, 37b) of the ball bearings (36a, 36b; 38a, 38b) are guided and held in cages (35a, 35b), so that the balls (37a, 37b) always are the same distance apart.

One ball bearing (36a, 36b) is thus constructed as a positive guide with two ball bearing guides (36a, 36b), while the other ball bearing (38a, 38b) with its two ball bearing guides (38a, 38b) permits also a certain motion of the balls (37b) running on it transversely of the axis of motion. The corresponding constructional embodiment of the ball bearings (36a, 36b; 38a, 38b) can be seen from FIG. 3b.

Above the upper coil (31), two further magnets (33), corresponding to the lower magnets (27), are mounted on the underside of a soft iron plate (34), which is fixedly attached by its upper side to the cover plate (26).

FIG. 3c shows a variant of the solution shown in FIG. 3b, with a narrow coil (43) and wide magnets (42a, 42b), wherein only two plates (40, 41) are shown for a linear motion in one axis. In order to make possible a motion in the other axis also, a corresponding arrangement above the upper, or below the lower, plate (40, 41) again has to be arranged.

The magnet width is here the displacement path plus the coil width. The attractive force of the magnets is used for preloading the bearings here also.

Figure 4A:
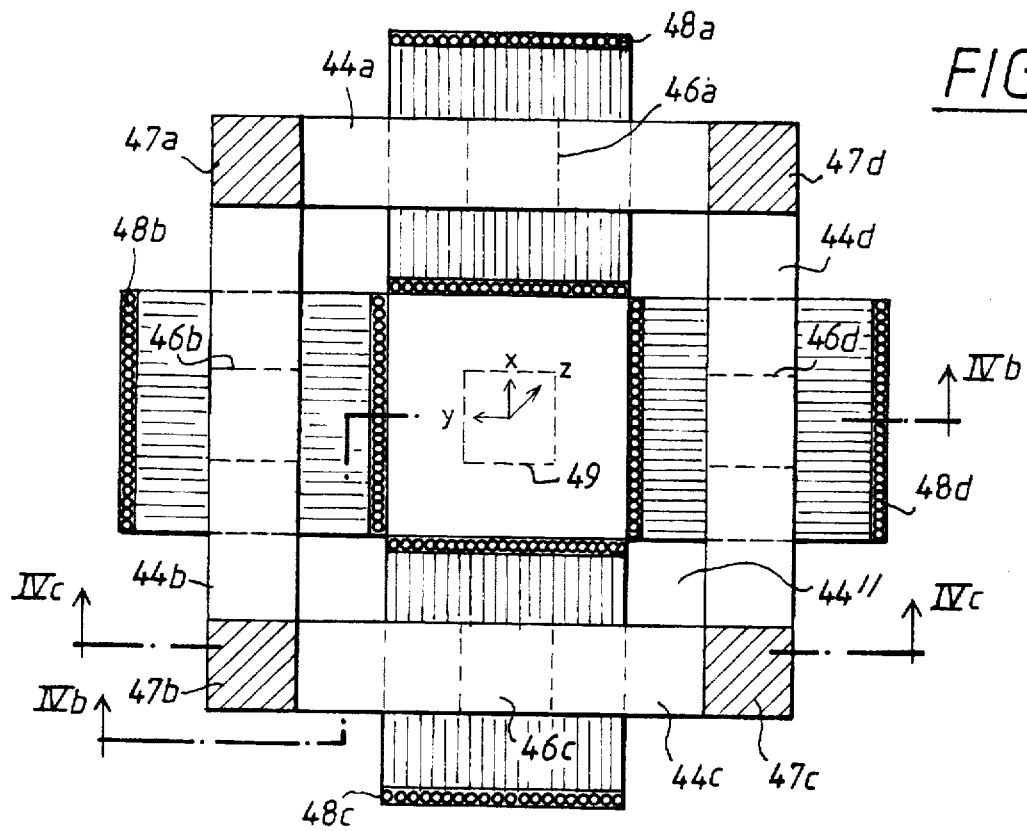
FIG. 4a shows a further variant according to the invention, in a plan view section.
Figure 4B:
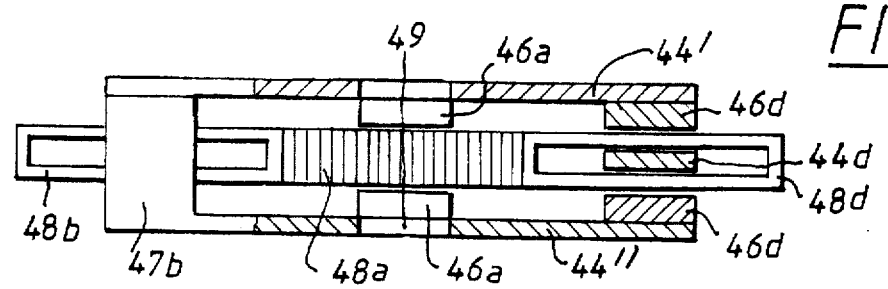
Figure 4C:
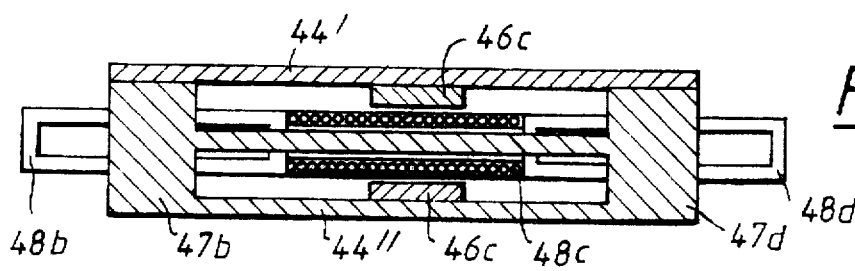

An X-Y table according to the invention, with a linear drive which has an ironless armature, is now shown for the first time in FIGS. 4a–4c, and makes possible a motion in two axes of motion.

This X-Y table substantially consists of two plates which are displaced relative to each other in a plane (X-Y). One plate is a square frame of soft iron, on which a respective magnet (46a, 46b, 46c, 46d) is arranged in the middle of each side (44a, 44b, 44c, 44d). A respective soft iron stator (47a, 47b, 47c, 47d) is arranged in each corner of the square frame, and ensures a defined distance from the upper partial plate (44') to the lower partial plate (44"). The magnets (46a, 46b, 46c, 46d) and the stators (47a, 47b, 47c, 47d) have the shape of rectangular columns with a square base surface.

A second plate is movably arranged between the upper and lower partial plates (44', 44"), which are rigidly connected together. This plate consists of four rectangular air coils (48a, 48b, 48c, 48d) which have a square surface in plan view. A soft iron web (44a, 44b, 44c, 44d) runs within these coils (48a, 48b, 48c, 48d) and is fixedly connected to the laterally arranged stators (47a, 47b, 47c, 47d).

Figure 4D:
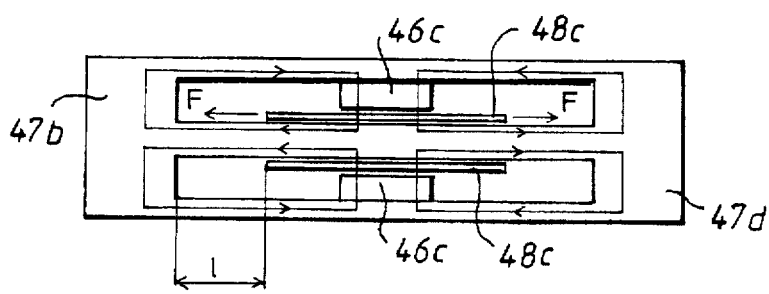
FIG. 4d shows a representation of the forces and magnetic fields of the table of FIGS. 4a, 4b and 4c.

The four rectangularly shaped air coils (48a, 48b, 48c, 48d) are joined together to form a cross, with the sense of winding running from outside to inside. The coils (48a, 48b, 48c, 48d) form a closed magnetic circuit. This magnetic circuit is shown in FIG. 4d, the possible displacement path in one axis in one direction being denoted by 1. F denotes the force vectors which effect the mutual displacement of the plates according to the direction of the current.

In this variant with the ironless coils (48a, 48b, 48c, 48d), no forces which have to be taken up by a bearing are exerted perpendicularly to the direction of motion. This can be an advantage for many applications.

An X-Y displacement table could also conceivably be such that the plate to be displaced is coupled to the air coils (48a–48d), and is mounted, completely frictionlessly, with air bearings to the baseplate with the magnetic circuit. Frictionless bearings in combination with the low mass of the air coils offer the advantage of the realization of highly dynamic applications.

The disadvantage of this solution is that much of the copper does not lie in the active magnetic field. The proportion of the copper which is not active increases the power loss and impairs the efficiency.

The poor efficiency is partially compensated for by an air bearing which is free from friction, since less thrust force is required and there is a smaller mass to be moved.

In the solution of a displacement table with a two-dimensional linear motor in combination with an air or ball surface bearing, rotary motions of the table plate about the Z-axis relative to the baseplate can also arise, besides the motions in the X and Y axes, as a result of forces acting eccentrically on the table plate.

These rotary motions can be compensated in a control circuit for the position if the rotary motion is measured with an additional sensor, in addition to the X- and Y-axis positional measurement system. The opposed coils which act on an axis (e.g., 48a and 48c on the Y-axis) are acted on by difference currents from the control unit, separately from each other, in dependence on the sign and angle of the rotation, until the angle of rotation becomes zero. If the coil (48a) is acted on, for example, by a positive current, and the coil (48c) by a negative current, a torque about the Z-axis arises.

A particular advantage of this solution consists in that a region moving in the X-Y plane with a free passage (49) exists in its middle, and can be used, for example, for illumination purposes when the table is used on a microscope.

Figure 5A:
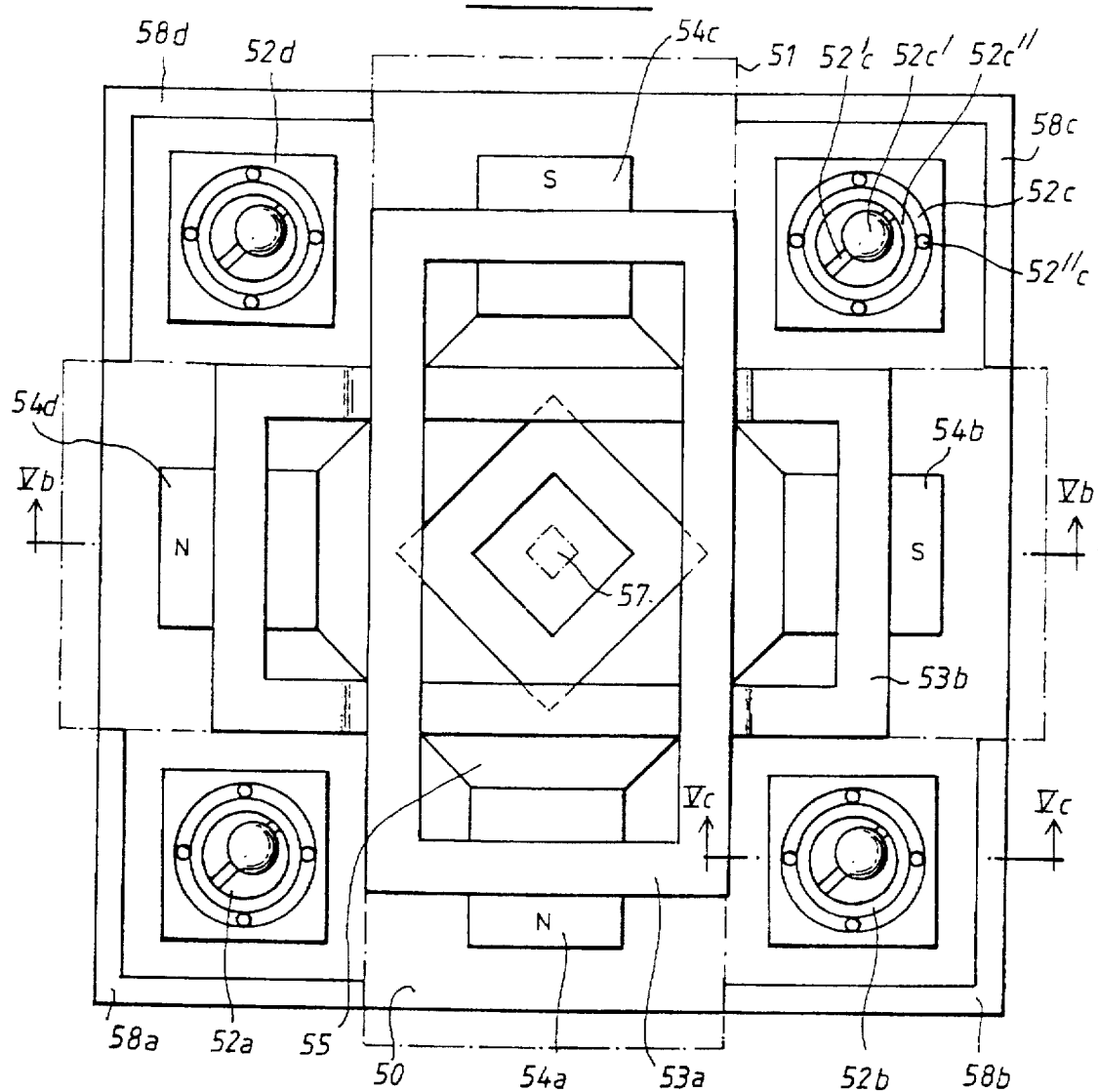
FIG. 5a shows a further variant according to the invention, in a plan view section, which is effected with only two plates moved relative to each other.
Figure 5B:
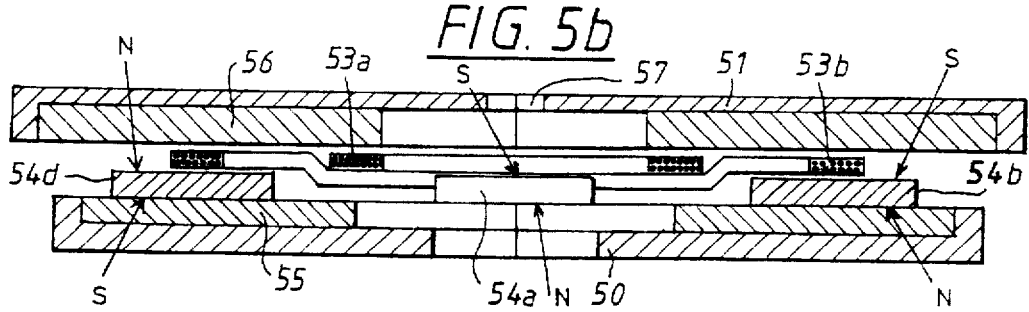
FIG. 5b shows a section through the table of FIG. 5a along the section line (Vb)

In FIGS. 5a, 5b and 5c a table is shown which is movable in two axes and in which only two plates (50, 51) are present, moved relatively to each other, and in which the principle of path gearing with roller ball bearings (52a, 52b, 52c, 52d) is applied. FIG. 5c shows a section along the line Vc—Vc in FIG. 5a. The displacement path of the variant shown here is±20 mm, but the linear motor only has to be designed for a path of±10 mm.

The table substantially consists of a baseplate (50), a cover plate (51), and the coils (53a, 53b) which are freely movable between the baseplate (50) and the cover plate (51). The coils (53a, 53b) are arranged crosswise one above the other. A respective rolling ball (52c') is fitted in each of the four corners of the coils (53a, 53b) (52a', 52b' and 52d are not identified, for the sake of clarity), and establish the distance of the two plates (50, 51) from each other. Each of these rolling balls (52c') (also 52a', 52b' and 52d') is axially mounted over an axis (52'c) (also 52'a, 52'b and 52'd are not identified, for the sake of clarity) in an annular cage (52c") (52a", 52b" and 52d" are not identified, for the sake of clarity), which furthermore is fixedly connected by means of respective ball bearings (52"c) (also 52"a, 52"b and 52"d), rotationally movable with the coils (53a, 53b). The balls (52c') (also 52a', 52b' and 52d') then run both on the baseplate (50) and also on the cover plate (51) in the permitted region of motion on ground bearing surfaces (54c'''). A respective end stop (58a, 58b, 58c, 58d) is present in each corner of the baseplate (50), and limits the motion of the rolling ball bearing (52a, 52b, 53c, 53d), and thus that of the cover plate (51), to the permitted range.

If now the cover plate (51) moves sideways, a slight swinging motion occurs due to the design of the rolling ball bearings (52a, 52b, 52c, 52d). This swinging motion must be predicted by the position control for the X- and Y-axis. This can take place, e.g., by means of stored equalization curves in a control computer or, e.g., by means of a comparison of reference and actual position by means of a path measurement system which measures in two axes (not shown in the Figure; constructed according to the known state of the art).

A two-dimensional linear motor is combined with rolling ball bearings (52a, 52b, 52c, 52d) which are movable on a plane, in the embodiment shown here by way of example.

Analogously to the one-dimensional linear displacement, two plates (50, 51) are here preloaded against each other magnetically by the magnetic field of the two-dimensional linear motor. The distance of the plates (50, 51) from each other is established by the rolling ball bearings (52a, 52b, 52c, 52d). Two two-dimensional moving coils (53a, 53b) in a cavity between the plates (50), (51) are coupled together and to the ball bearings (52a, 52b, 52c, 52d).

Here turns for the X-Y motor lie crosswise over one another. Two each, oppositely arranged, permanent magnets for the X-drive (54b, 54d) or the Y-drive (54a, 54c) are anchored with a soft iron connection (55) in the baseplate (50). A cross-shaped second soft iron connection (56) in the cover plate (51) closes the magnetic circuit over an air gap in which a portion of the coils (53a, 53b) can move freely.

If current flows through one, or simultaneously through both, of the two coils (53a, 53b), a force then acts, according to the electromotive principle, at 90° to the direction of winding of the coils (53a, 53b). This force F is transmitted to the balls (52a, 52b, 52c, 52d) of the bearings. The cover plate (51) is then moved, according to the rolling friction principle, relative to the baseplate (50), and in fact with twice the path traveled by the coils (53a, 53b).

The particular advantage of the table which is shown in FIGS. 4a-d is retained in this table also. The central region (57) remains free during all motions of the table in the permitted range, and can be used for illumination and/or observation purposes. This is particularly important when this table is used on a microscope.

The two-dimensional linear drive in FIGS. 4a-4d can also be combined with the geared rolling ball bearing shown in FIGS. 5a and 5b. The cages of the rolling ball bearing here have to be connected fixedly to the four coils, arranged crosswise (48a-48d). The upper soft iron back coupling, consisting of the upper partial plate (44'), must be separated by an air gap from the stators (47a-47d) and integrated into a cover plate. The lower soft iron partial plate (44'), the side parts (44a-44d) and the stators (47a-47d) are integrated into a baseplate. The rolling ball bearings run on ground surfaces between the baseplate and the cover plate, and are simultaneously, magnetically preloaded via the magnetic back connection of the linear motor. The advantage of this combination is the possibility of compensating for rotary motions about the Z-axis.

FIG. 6 shows an alternative arrangement of the coils (63a, 63b, 63c, 63d) to the examples shown in FIGS. 5a-c.

Here there are four coils (63a, 63b, 63c, 63d), two per axis, which are electrically connected in series, and, as in the previous example, are fastened to a common soft iron plate (not shown in the Figure, shaped as shown in FIG. 5c). The permanent magnets (64a, 64b, 64c, 64d) are made longer here and are again coupled together by means of a soft iron plate (65). The lever relationships for the action of a force against rotation about the Z-axis are thereby more favorable.

In other respects, the baseplate (60) is here also magnetically preloaded towards the cover plate (not visible in the Figure), the distance between the two plates being defined by rolling ball bearings (62a, 62b, 62c, 62d). The free passage (67) through the two plates is larger here than in FIG. 5a.

Figure 7A:
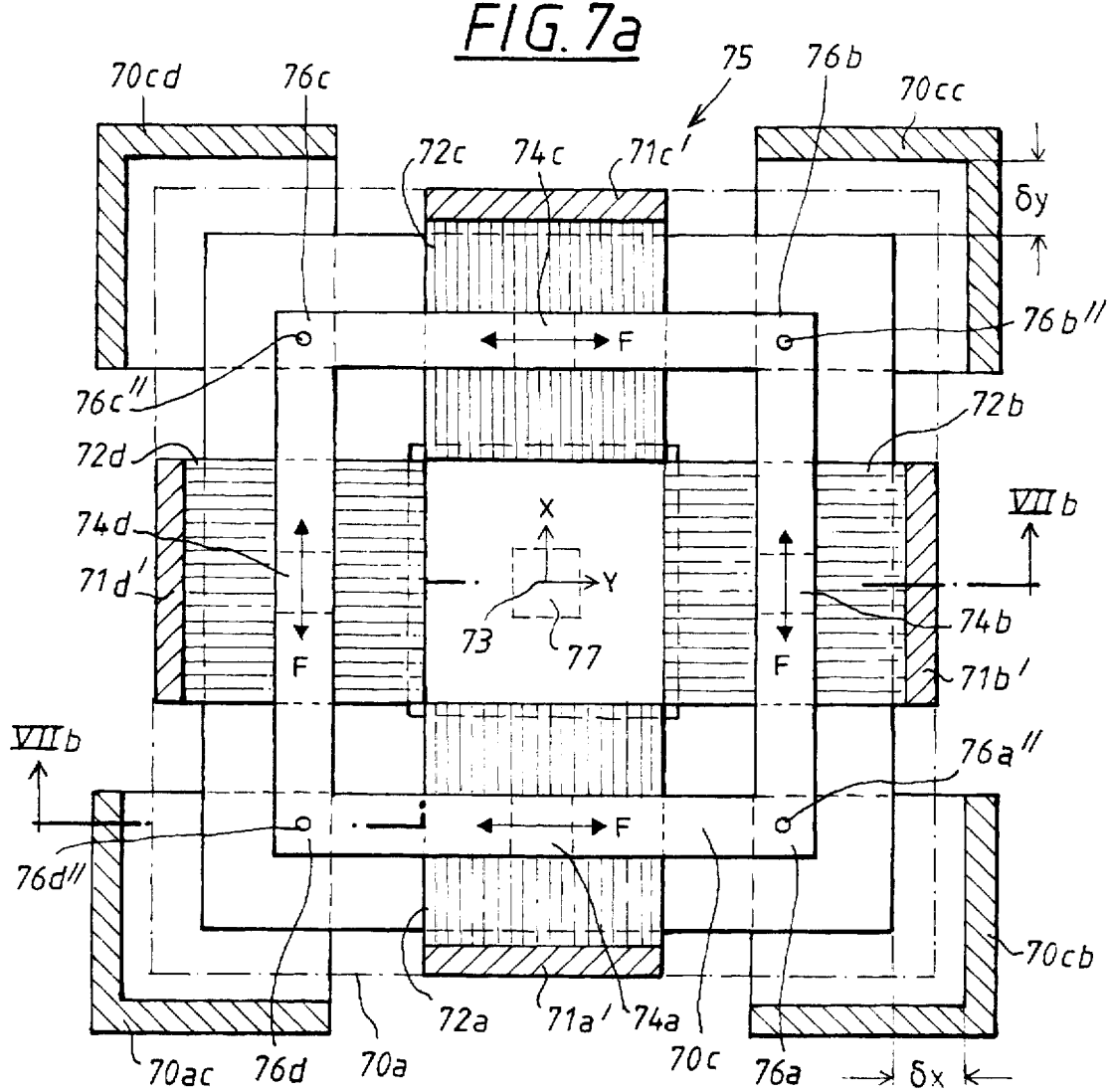
FIG. 7a shows a table according to the invention as a schematic drawing, with air bearings, in a plan view section.
Figure 7B:
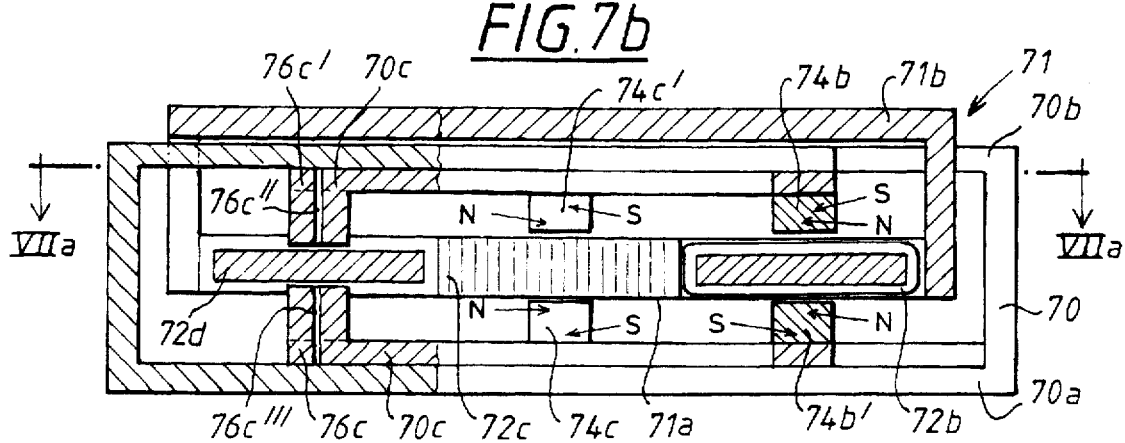
FIG. 7b shows the table of FIG. 7a, in section.
Figure 8A:
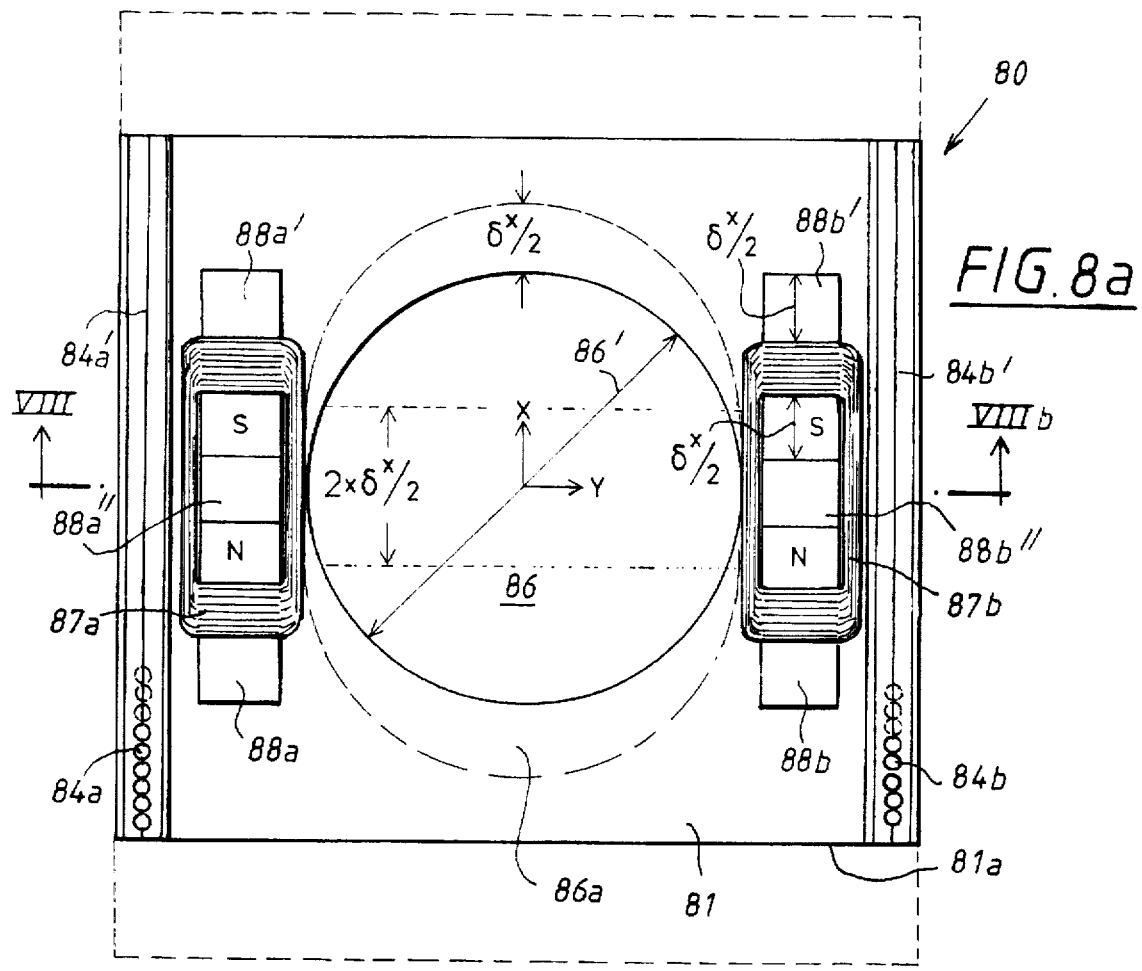
FIG. 8a shows a table according to the invention, with a large free middle opening, as a schematic drawing of the baseplate in plan view section along the section line (VIIIa) of FIG. 8b.
Figure 8B:
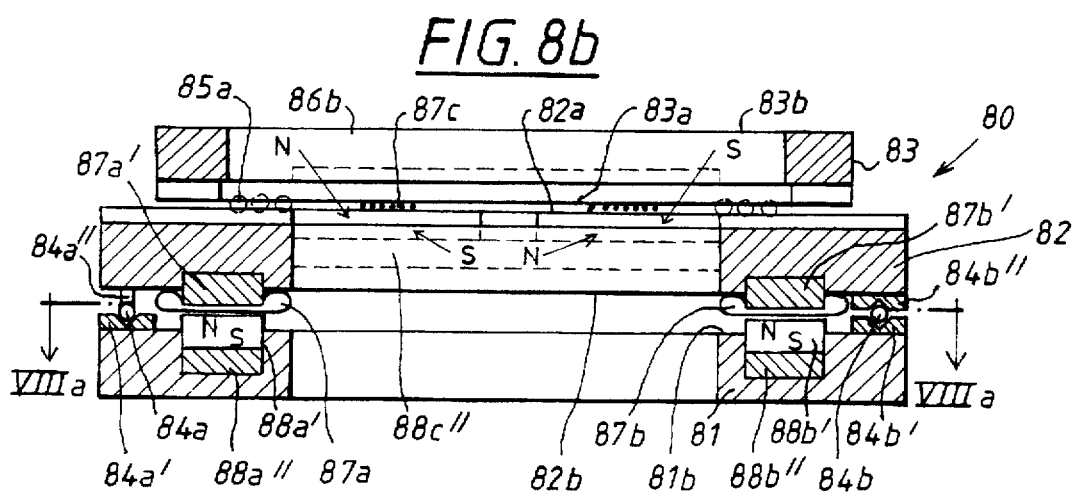
Figure 8C:
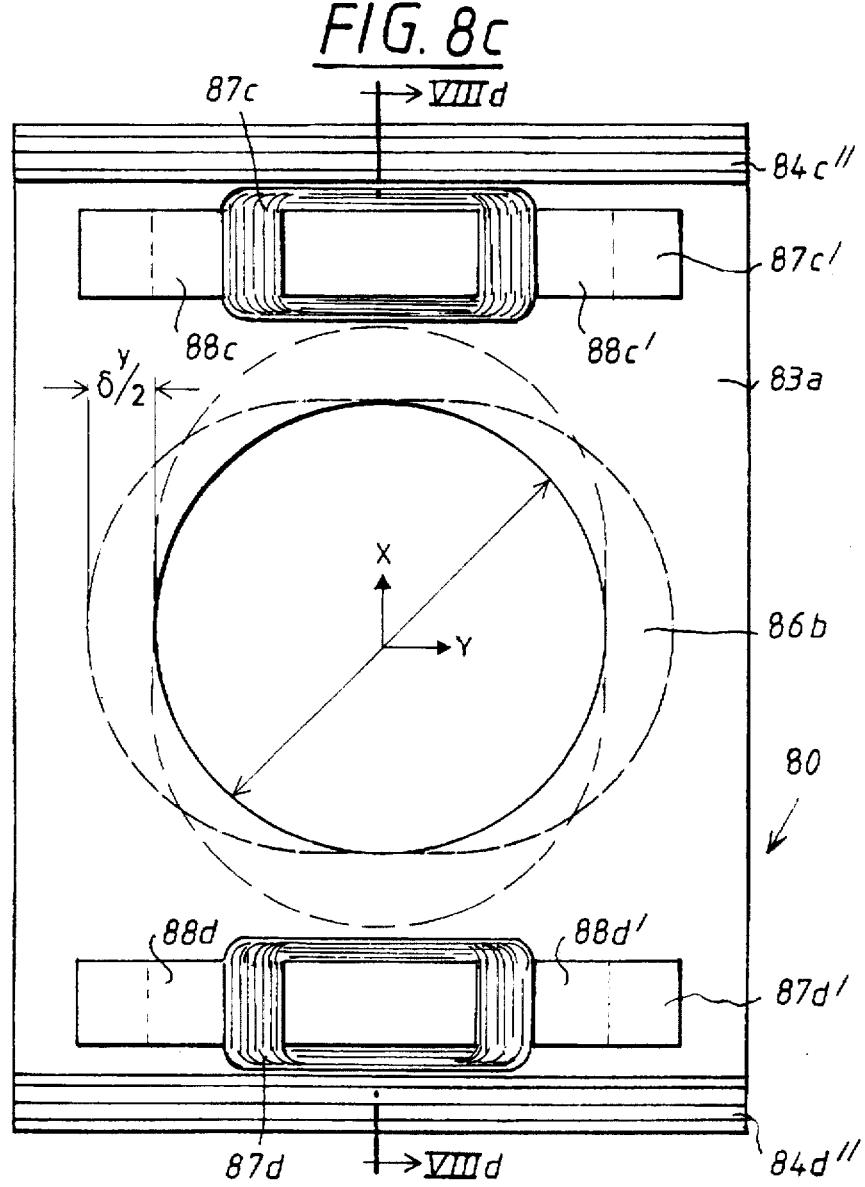
FIG. 8c shows the underside of the cover plate from FIG. 8b.
Figure 8D:
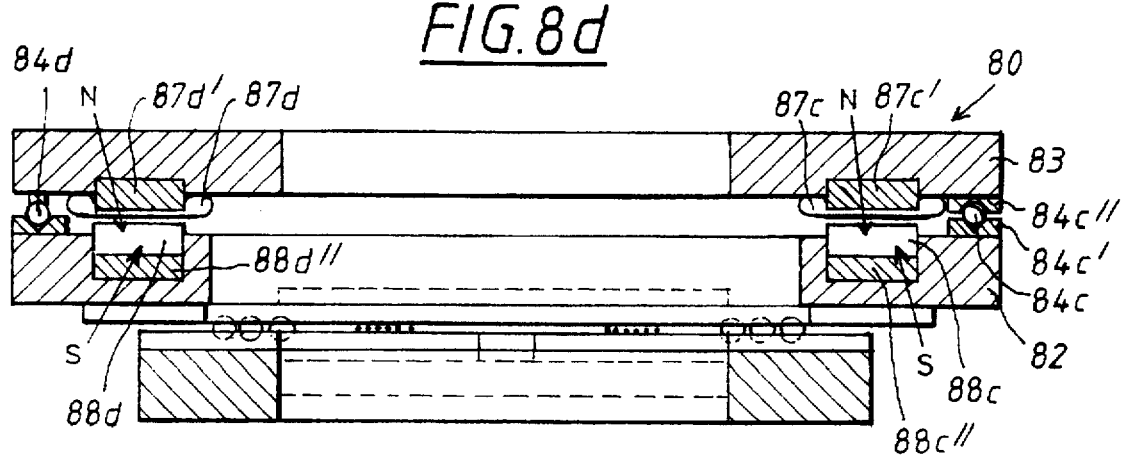
FIG. 8d shows the table from FIGS. 8a and 8c in section in the X-axis, along the section line (VIIId) of FIG. 8c.

An X-Y table (75) with a two-dimensional linear drive is shown in FIGS. 7a and 7b, and has air bearings.

The table (75) has two plates (70, 71); the cover plate (71) can be displaced relative to the baseplate (70) in a plane (X-Y). The cover plate (71) has a lower plate (71a) of soft iron, on which four coils (72a, 72b, 72c, 72d) are arranged in a cross shape. The windings of the coils (72a, 72b, 72c, 72d) are thereby oriented to one plane through the midpoint (73) of the table. The lower plate (71a) has, at the outer ends of the coils (72a, 72b, 72c, 72d), webs (71a', 71b', 71c', 71d') by means of which the lower plate (71a) is connected to the upper plate (71b) of the cover plate (71). Respective permanent magnets (74a, 74a'; 74b, 74b'; 74c, 74c'; 74d, 74d') are arranged above and below each of the coils (72a, 72b, 72c, 72d); these are respectively fastened to the upper and lower plate (71b, 71a) of the baseplate by means of a soft iron connector (70c). The upper plate (71b) of the cover plate (71) and also the upper and lower plates (70b, 70a) of the baseplate (70) consist of a non-magnetic material. The soft iron connector (70c) consists of two square frames, in the vertices of which are located the extensions or poles (76a, 76a'; 76b, 76b'; 76c, 76c'; 76d, 76d'; where 76a', 76b'and 76d' are not visible in the Figures), which close the magnetic circuit over the plate (71a).

The baseplate (70) has stop bodies (70ca, 70cb, 70cc, 70cd) at the lateral corners, limiting the motion of the table to the permitted range (δx, δy). The cover plate (71) can thus be moved relative to the baseplate (70) by 2 x δx or 2 x δy. The soft iron plate (70c) of the baseplate (70) has in the corners four extensions (76a, 76a'; 76b, 76b'; 76c, 76c'; 76d, 76d', where 76a', 76b', and 76d' are not visible in the Figures), arranged in a cross shape. A round air channel (76a'', 76a'''; 76b'', 76b'''; 76c'', 76c'''; 76d'', 76d'''; where 76a''', 76b''' and 76d''' are not visible in the Figures) is respectively centrally located in each of the four poles or extensions (76a, 76a'; 76b, 76b'; 76c,76c'; 76d, 76d', where 76a', 76b', and 76d' are not visible in the Figures). Air can be conducted through these air channels (76a'', 76a'''; 76b'', 76b'''; 76c'', 76c'''; 76d'', 76d'''; where 76a''', 76b''' and 76d''' are not visible in the Figures), so that the cover plate (71) floats on the baseplate (70) by means of an air cushion (air bearing).

A central through opening (77) around the table midpoint (73) is located in the middle of the table (75).

In FIGS. 8a, 8b, 8c and 8d, a table (80) is now shown, in which the baseplate (81) can be displaced relative to the middle plate (82), and the middle plate (82) relative to the cover plate (83), by means of rolling balls (84a, 84b, 84c, 84d), with respect to each other in a respective axis (X or Y), with a magnetic preloading of the bearings being effected by means of a linear drive. In principle, the table (80) is built like the table shown in FIGS. 1a, 1b and 1c.

The essential difference between this table (80) and the X-Y tables shown in the preceding Figures is, on the one hand, the large free middle opening (86) and, on the other hand, the use of two linear motors per axis of motion (X or Y). The two linear motors per axis here have coils (87a, 87b;

87c, 87d) which are connected in parallel or in series and which act like a single linear motor, so that the resulting displacement force acts in the center of the driven plate (82, 83), or the displacement force vector in one axis is arranged parallel to the axis of motion and acts on the middle of the side surface which runs perpendicularly to the axis of motion.

By the division of the linear drive, it is possible to keep the dimensions of the table (80) small, and in spite of this to obtain a large middle opening (86).

The baseplate (81) consists of a base body of nonmagnetic material. A respective V-shaped rail (84a', 84b'; 84c', 84d') is arranged laterally in the direction of the axis of motion on the surface (81b) of the baseplate (81) and the surface (82a) of the middle plate (82). Besides these rails (84a', 84b'; 84c', 84d'), respectively two permanent magnets (88a, 88a'; 88b, 88b'; 88c, 88c'; 88d, 88d') are arranged with a given spacing on a soft iron plate (88a", 88b", 88c", 88d") connecting them. An opening (86a, 86b) is located between the respective two magnet pairs (88a, 88a'; 88b, 88b'; 88c, 88c'; 88d, 88d') on their respective soft iron plates (88a", 88b", 88c", 88d") The shape of the opening is chosen such that its small axis coincides on the Y-axis with the circular opening (86) in the baseplate (81). In the X-axis, the elliptical opening (86a) of the middle plate (82) is respectively enlarged by half of the displacement path $\delta/2$ on this axis, so that in the maximum motion region on the X-axis the circular opening (86) in the baseplate is not overshadowed. The two coils (87a, 87b; 87c, 87d) of each axis are wound such that their windings respectively have as small as possible a volume in the direction of motion (i.e., they are shaped as near circular as possible), while the windings of the coils (87a, 87b, 87c, 87d) are arranged as close together as possible perpendicular to the direction of motion.

In the starting position (see FIG. 8a), the coils (87a, 87b, 87c, 87d) lie over the middle of the magnets (88a, 88a'; 88b, 88b'; 88c, 88c'; 88d, 88d'). The magnets (88a, 88a'; 88b, 88b'; 88c, 88c'; 88d, 88d') are dimensioned in width such that they include as completely as possible the windings, arranged parallel, of the coils (87a, 87b, 87c, 87d). The magnets (88a, 88a'; 88b, 88b'; 88c, 88c'; 88d, 88d') are dimensioned in length such that they always remain situated above or below the coils (87a, 87b, 87c, 87d) over the whole displacement path.

The two coils (87a, 87b) of the lower parallel or series connected linear motors are respectively fixedly arranged on a soft iron plate (87a', 87b'). These soft iron plates (87a', 87b') are dimensioned in the axis of motion such that they still are always situated completely above the magnets (88a, 88b), even at the maximum displacement path ($2 \times \delta_x/2$ or $2 \times \delta_y/2$). Between the coils (87a, 87b) and the magnets (88a, 88a'; 88b, 88b') situated opposite them, there is an air gap whose distance does not change at the maximum displacement path (in the scope of the manufacturing tolerances). Two rails (84", 84b") for the rolling balls (84a, 84b) are fitted outside, laterally of the coils (87a, 87b). While the one rail (84b") is constructed as a V-rail and effects a positive guiding of the rolling ball (84b), the other rail (84a") permits a slight lateral motion of the roller ball (84a), so that production tolerances ball bearings cannot the ball bearings cannot lead to their tilting.

On the upper side (82a) of the middle plate (82), this is designed corresponding to the upper side (81a) of the baseplate (81) for the upper linear drive and the ball bearing guides fitted there. Only the middle opening is circular and has the diameter (86') shown in FIG. 8a. The underside (83a) of the cover plate (83) is designed corresponding to the underside (82b) of the middle plate (82). The middle opening (86b) is designed such that its extent in the X-axis coincides with the circular diameter of the opening (86) in the baseplate (81). On the Y-axis, the opening (86b) is enlarged by $2 \times \delta_y$.

The opening (86a, 86b) thus consists of two semicircular openings which have between them two respective straight pieces of length $\geq 2 \times \delta_x$ or $\geq 2 \times \delta_y$.

All the variants shown here have linear motors without commutation. These motors are distinguished, in combination with a linear power amplifier, by a quasi infinite resolution. The position accuracy depends only on the path measurement system used. The region of movement of these motors is of course restricted. Linear motors with brushes or electronic commutation can of course be used in the variants with linear roller bearings or ball bearings. The possible displacement path would then not be so narrowly limited.

I claim:

1. A linearly displaceable precision table for displacement of a cover plate relative to a base plate for motion in at least one coordinate axis by at least one linear drive, comprising:
   a linear drive having at least one magnet and at least one coil,
   a cover plate having a lower side, and
   a base plate having an upper side,
   wherein said linear drive comprises a noncommutation linear motor and said magnet and said coil are mounted alternatively on said lower side of said cover plate and said upper side of said base plate, such that a resultant force of said magnet and said coil is exerted centrally on a plate to be moved.

2. The linearly displaceable precision table according to claim 1, wherein said magnet and said coil have lines of force that are oriented in one case substantially perpendicular and in another case substantially parallel to an axis of motion of said linearly displaceable precision table.

3. The linearly displaceable precision table according to claim 1, further comprising a magnetically preloaded guide fitted between said cover plate and said base plate.

4. The linearly displaceable precision table according to claim 3, wherein said magnetically preloaded guide has two ball bearings oriented in a direction of motion of said linearly displaceable precision table.

5. The linearly displaceable precision table according to claim 3, further comprising a yoke connected to said coil, wherein magnetic preloading is affected by said magnet and said yoke.

6. The linearly displaceable precision table according to claim 1, further comprising a middle plate, wherein at least one of said magnet and at least one of said coil is mounted alternatively on said cover plate and on said middle plate, and at least one of said magnet and at least one of said coil is alternatively mounted on said middle plate and said base plate.

7. The linearly displaceable precision table according to claim 1, further comprising an end stop mounted on one of said plates.

8. The linearly displaceable precision table according to claim 1, wherein said linear drive includes a plurality of said coils associated with an axis of motion that are connected together in parallel.

9. The linearly displaceable precision table according to claim 1, wherein said linear drive includes a plurality of said coils associated with an axis of motion that are connected together in series.

10. The linearly displaceable precision table according to claim 1, wherein said linearly displaceable precision table has a through opening in its middle region.

11. The linearly displaceable precision table according to claim 1, further comprising a speed changing transmission mounted between two said plates that are moved relative to each other, wherein said speed changing transmission comprises at least one roller cage in which rollers of a linear ball bearing are confined, wherein force of said linear drive acts on said roller cage.

12. The linearly displaceable precision table according to claim 6, further comprising a speed changing transmission mounted between two said plates that are moved relative to each other, wherein said speed changing transmission comprises at least one roller cage in which rollers of a linear ball bearing are confined, wherein force of said linear drive acts on said roller cage.

13. The linearly displaceable precision table according to claim 1, wherein said linear drive includes a plurality of said coils movable in both axes of an x-y plane.

14. The linearly displaceable precision table according to claim 1, further comprising at least three rolling balls that support said cover plate directly on said base plate.

15. The linearly displaceable precision table according to claim 1, further comprising air bearings between said cover plate and said base plate for mounting said cover plate on said base plate.

16. The linearly displaceable precision table according to claim 1, wherein said linear drive for one axis comprises two drives that are oppositely placed and separately controllable.

17. The linearly displaceable precision table according to claim 16, further comprising a ball bearing mounted between two said plates that are movable relative to each other.

* * * * *